United States Patent
Eckart et al.

(10) Patent No.: US 6,602,016 B2
(45) Date of Patent: Aug. 5, 2003

(54) HYDRAULIC LINE MOUNTING CLAMP

(75) Inventors: Dennis D. Eckart, Gold Bar, WA (US); Lee D. Keddie, Woodinville, WA (US)

(73) Assignee: HKX Inc., Monree, WA (US)

( * ) Notice: Subject to any disclaimer, the term of this patent is extended or adjusted under 35 U.S.C. 154(b) by 61 days.

(21) Appl. No.: 09/838,003

(22) Filed: Apr. 18, 2001

(65) Prior Publication Data

US 2001/0051072 A1 Dec. 13, 2001

Related U.S. Application Data (60) Provisional application No. 60/197,999, filed on Apr. 18, 2000.

(51) Int. Cl.[7] .............................. B25G 3/00; F16D 1/00; F16L 23/00
(52) U.S. Cl. ....................... 403/110; 403/337; 403/338; 403/344; 403/DIG. 9
(58) Field of Search .......................... 403/344, DIG. 9, 403/338, 337, 370, 381, 110

(56) References Cited

U.S. PATENT DOCUMENTS

| | | | | |
|---|---|---|---|---|
| 3,906,592 A | * | 9/1975 | Sakasegawa et al. | 24/73 CC |
| 4,437,791 A | * | 3/1984 | Reynolds | 405/195 |
| 4,482,265 A | * | 11/1984 | Koza | 403/71 |
| 4,487,523 A | * | 12/1984 | Monroe | 403/385 |
| 5,669,590 A | * | 9/1997 | Przewodek | 248/68.1 |
| 5,873,608 A | * | 2/1999 | Tharp et al. | 284/114 |
| 5,904,445 A | * | 5/1999 | Meuth | 405/195.1 |
| 5,941,653 A | * | 8/1999 | Cipriani | 403/344 |
| 5,984,584 A | * | 11/1999 | McMillan et al. | 405/195.1 |
| 5,988,286 A | * | 11/1999 | Dwiggins | 166/382 |
| 6,007,058 A | * | 12/1999 | Kokubo et al. | 267/140.12 |
| 6,085,422 A | * | 7/2000 | Hirabayashi | 30/122 |

* cited by examiner

*Primary Examiner*—Christopher J. Novosad
(74) *Attorney, Agent, or Firm*—Todd N. Hathaway (57) ABSTRACT

A bolt-on clamp assembly for mounting a hydraulic line to a support structure, such as a boom or articulated arm. There are upper and lower clamp members having jaw portions that define a receiving area for the hydraulic line. The clamp members are joined by a hinge structure on one side of the receiving area, which forms a fulcrum for downward pivoting motion of the upper clamp member while the lower clamp member rests on the underlying structure. A mounting area is formed on the opposite side of the receiving area, and includes coaxially aligned bores for passage of a mounting bolt through a upper and lower clamp members. As the mounting bolt is tightened, the hydraulic line is gripped between the jaw portions of the clamp members. Opposing stop faces are formed on the mounting portions of the upper and lower clamp members to limit the pivoting motion and thereby prevent crushing or deformation of the hydraulic line. A depending flange may also be provided on the upper clamp member to form a pivot point that enables the upper clamp member to be used separately as a one-piece clamp, without the lower clamp member.

28 Claims, 5 Drawing Sheets

HYDRAULIC LINE MOUNTING CLAMP

This application claims the benefit of U.S. Provisional Application No. 60/197,999 filing date Apr. 18, 2000.

BACKGROUND OF THE INVENTION a. Field of the Invention

The present invention relates generally to hydraulic systems used in heavy equipment and the like, and, more particularly, to a clamp assembly for mounting hydraulic lines to the booms and arms of heavy equipment and similar structures.

b. Related Art

Hydraulic lines are commonly employed to supply hydraulic oil to actuators that operate the various components of heavy equipment and similar apparatus. For example, such lines are commonly used to supply oil to hydraulic cylinders and rams for operating various parts and systems on earth-moving and land-clearing equipment. Typically, the hydraulic lines are constructed of lengths of rigid steel tubing that are joined by hoses where flexible connections are required.

Figures 1, 2A:
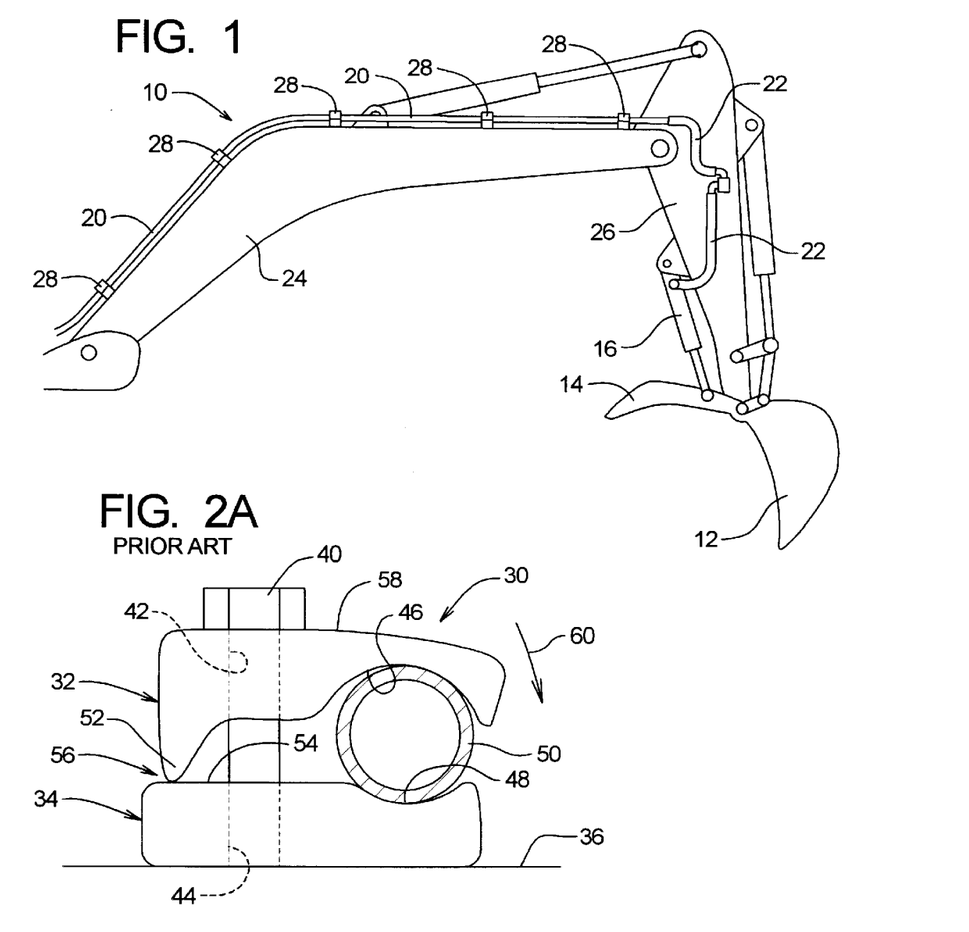
FIG. 1 is a perspective, environmental view of an exemplary excavator arm, showing the general manner in which hydraulic lines are mounted to the support members thereof.
FIGS. 2A–2B are, respectively, side and end elevational views of a prior art form of clamp assembly, showing the manner in which this engages a section of hydraulic line.

For example, FIG. 1 shows an exemplary articulated excavator arm 10 having a bucket 12 mounted on its outer end. The bucket is provided with a "thumb" attachment 14 which is operated by a hydraulic cylinder 16. Hydraulic pressure is applied to the cylinder from a remote source (e.g., hydraulic pump mounted on a main chassis) via rigid hydraulic lines 20 and flexible hoses 22.

As can be seen in FIG. 1, the rigid hydraulic lines 20 are secured to the segments 24, 26 of the articulated arm by mounting clamps 28. It is important for the clamps to hold the lines tightly to the arm, in order to prevent the lines from hanging loose and becoming caught on external objects or otherwise being damaged during use. Furthermore, the clamps must hold the hydraulic lines against longitudinal movement in order to prevent the lines from "creeping" and working loose in response to internal pressure changes.

In some original equipment manufacturer (OEM) installations, these problems are dealt with using a mounting structure that is welded to the support boom and sometimes directly to the hydraulic line itself. In other installations, however, there is a need for a device for detachably mounting the hydraulic lines to the support structure, or for subsequently attaching one or more additional lines in a convenient and secure manner. This is especially true in the case of after-market attachment that are added to existing equipment, such as the thumb attachment 14 which is shown in FIG. 1, for example.

One type of device which is used for this purpose is a bolt-on clamp assembly, which has the advantage of relatively easy installation and/or removable. Moreover, the bolt-on clamp assemblies can often be used to "piggy back" on existing OEM mounts: the original mounting bolt is removed and the after-market clamp is placed on top of the OEM bracket or clamp, and then a new, longer bolt is passed through both clamps to secure the assembly to the support structure.

Figure 2B:
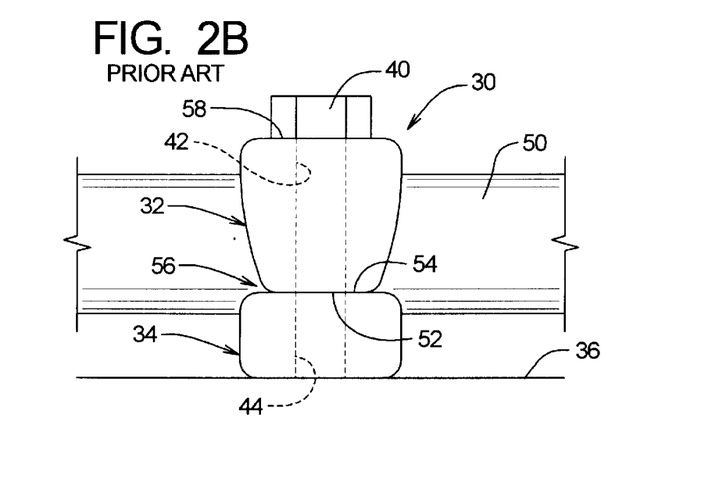

While advantageous for the reasons described above, prior forms of bolt-on clamp assemblies have generally been less than satisfactory in one respect or another. To illustrate this, FIGS. 2A–2B show a prior art clamp assembly 30, of a type that is used by several manufacturers. As can be seen, the clamp assembly includes upper and lower members 32, 34, which are typically formed of ordinary cast steel. The clamp members are mounted to the underlying support structure 36 by a bolt 40 that passes through corresponding bores 42, 44 and is threaded into a cooperating bore in the underlying structure. Upper and lower generally concave jaw portions 46, 48 are located to one side of the bolt and are configured for receiving a rigid hydraulic line 50 having a corresponding diameter. On the opposite side of the mounting bolt, the edge of the upper member extends downwardly to form a pointed flange 52 which bears against the upper surface 54 of the lower clamp member so as to form a fulcrum 56. Thus, as bolt 40 is tightened, the downward pressure which is inserted by the head of the bolt against the upper surface 58 of the upper clamp member 32 causes the jaw portion 46 to pivot downwardly in the direction indicated by arrow 60, thus exerting a clamping force against hydraulic line 50.

One deficiency of clamps of the type shown in FIGS. 2A–2B is that the location of the bolt between the fulcrum and the jaw portions results in a reduced mechanical advantage, i.e., the grip force which is exerted at the jaw portions is actually less than that which is exerted by the bolt against the clamp members. This type of clamp is also cumbersome and difficult to use, being that the upper and lower members tend to twist relative to one another until they move into engagement with the hydraulic line, so that the assembly tends to "flop" about and become misaligned during installation.

Perhaps more seriously, the jaw portions of such clamps tend to deform and crush the hydraulic line as the assembly is tightened, which is undesirable from the standpoint of reducing flow and compromising the structural integrity of the line, amongst other reasons. This problem is compounded by the fact that the jaw portions, with their pincer-like movement, are only able to engage limited areas along the top and bottom of the hydraulic line, which impairs their ability to establish frictional engagement with the line; as was noted above, it is important for the clamp to hold the hydraulic line against longitudinal "creeping" motion, as well as against motion in lateral directions. As a result, the tendency is for the operator to tighten the bolt even further in an effort to stop longitudinal movement of the hydraulic line, thereby increasing the deformation and damage to the line.

In some instances, manufacturers have resorted to the expedient of installing a plastic or rubber insert between the jaws in an effort to reduce damage to the hydraulic lines. Unfortunately, the inserts tend to slip against the hydraulic lines, with the result that longitudinal movement/creep of the lines increases unacceptably. Furthermore, the plastic/rubber inserts tend to melt when subjected to the high temperatures that hydraulic lines develop in many types of machinery.

Accordingly, there exists a need for a bolt-on clamp assembly for mounting hydraulic lines to a support structure that establishes a firm grip against the hydraulic line without causing deformation or crushing of the line. Furthermore, there exists a need for such a clamp assembly that avoids deformation/crushing of hydraulic lines without need for an elastomeric or deformable insert. Still further, there exists a need for such a clamp assembly that establishes a firm frictional engagement with hydraulic lines so as to prevent longitudinal movement of the lines relative thereto. Still further, there exists a need for such a clamp assembly that is mechanically efficient so as to avoid the need for over-tightening the mounting bolt which secures the assembly to the support structure. Still further, there exists a need for such a clamp assembly in which the clamp members thereof are linked in stable relationship with respect to one another so as to avoid twisting and/or misalignment during installation.

SUMMARY OF THE INVENTION

The present invention has solved the problems cited above, and is a bolt-on clamp assembly for mounting a hydraulic line to a support structure.

Broadly, the clamp assembly comprises upper and lower clamp members, the upper clamp member having a downwardly facing jaw portion and the lower clamp member having an upwardly facing jaw portion, so that the jaw portions define a receiving area for engaging a hydraulic line therein; a mounting portion located to one side of the receiving area for passage of a mounting bolt therethrough; and a hinge structure interconnecting the upper and lower clamp members so as to form an upwardly-directed fulcrum on a side of the receiving area opposite the mounting portion, so that the upper clamp member pivots about the upwardly-directed fulcrum in response to tightening of the mounting bolt so as to exert a downwardly directed clamping force against the hydraulic line in the receiving area.

The hinge structure interconnecting the upper and lower clamp members may comprise an upwardly-projecting flange portion formed along the edge of the upper clamp member, and a downwardly facing channel portion formed along an edge of the lower clamp member for receiving the upwardly projecting flange in pivoting engagement therewith, so as to form the upwardly-directed fulcrum and also prevent the upper clamp member from twisting relative to the lower clamp member. The mounting portion may comprise first and second co-axially aligned bores formed in the upper and lower clamp members for passage of the mounting bolt therethrough.

The clamp assembly may further comprise means for limiting the pivoting motion of the upper clamp member to a predetermined range so as to prevent the hydraulic line from being crushed or deformed between the jaw portions of the members. The means for limiting the pivoting motion of the upper clamp member may comprise a first stop face formed on a lower surface of the upper clamp member and a second stop face formed on an upper surface of the lower clamp member in opposition to the first stop face, the first and second stop faces being spaced apart by a pinch gap of predetermined width when a hydraulic line of predetermined diameter is received between the jaw portions of the upper and lower clamp members.

The upper clamp member may further comprise a downwardly-extending flange portion formed on an edge of the upper clamp member opposite the upwardly-projecting flange portion, so that the downwardly-extending flange portion bears against an underlying support surface so as to provide a fulcrum point on the opposite side of the mounting bolt from the jaw portion when the upper clamp member is used as a single-piece clamp without the lower clamp member. The lower clamp member may further comprise a corresponding recess for receiving the downwardly projecting flange portion of the upper clamp member therein.

The jaw portions of the upper and lower clamp members may each have a substantially hemicylindrical contour, so that the jaw portions engage the hydraulic line about substantially the entire circumference thereof.

The upper and lower clamp members may have a substantially uniform cross-section in a direction parallel to the cylindrical axis of the jaw portions, so that the clamp members may be formed of extruded material, such as high strength extruded aluminum alloy.

The invention also provides a hydraulically operated apparatus having a bolt-on clamp assembly for mounting a hydraulic line to a support member, in which the support member may be, for example, a segment of an articulated arm of the apparatus. The support structure may also be an outwardly extending bracket for supporting the hydraulic line at a spaced distance from the arm or other portion of the hydraulically powered apparatus.

These and other features and advantages of the present invention will be more fully understood from a reading of the following detailed description with reference to the associated figures.

DETAILED DESCRIPTION

The terms "upper", "lower", "horizontal", "vertical" and the like are used in this description and the appended claims for ease of clarity in describing the configuration and relationship of the components of the present invention, with, for reference, "lower" generally meaning in the direction towards the underlying support structure to which the clamp assembly is bolted and "horizontal" generally meaning the orientation of the surface of the support structure. It will be understood however, that the actual physical orientation of the clamp assembly and its components will depend of the physical orientation of the structure (e.g., a boom or arm) to which it is mounted.

Figures 3, 4, 5A:
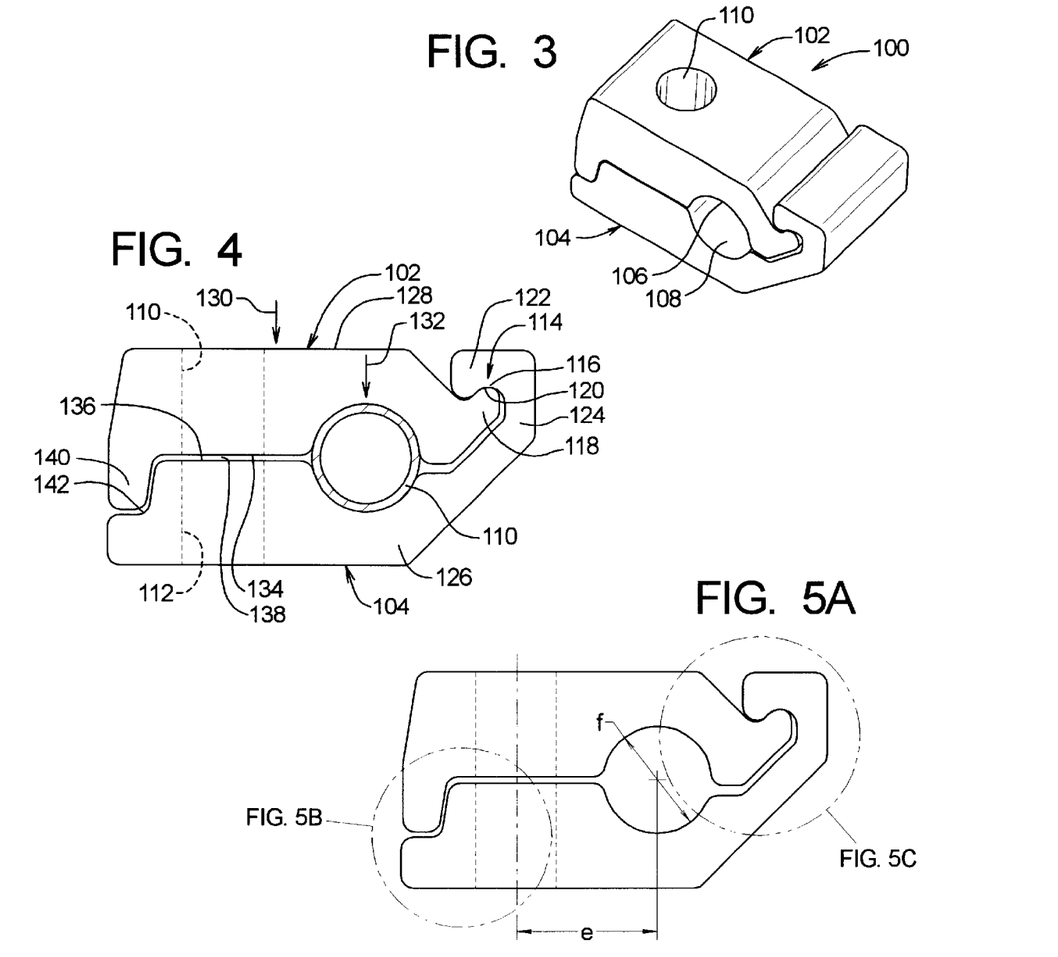
FIG. 3 is a perspective view of a clamp assembly in accordance with the present invention, showing the manner in which the upper and lower members thereof fit into engagement with one another for installation.
FIG. 4 is a side elevational view of the clamp assembly of FIG. 3, showing the configuration and relationship of the upper and lower clamp members in greater detail.
FIG. 5A is a side elevational view of a clamp assembly in accordance with the present invention, similar to FIG. 4, showing the engagement areas and clearances/gaps between upper and lower clamp members.

FIG. 3 shows a two-piece bolt-on clamp assembly 100 in accordance with the present invention. As can be seen, the assembly includes an upper clamp member 102 and a lower clamp member 104. The upper clamp member includes a concave upper jaw portion and the lower clamp member includes a corresponding concave lower jaw portion 108. As can be seen, each of the jaw portions has a generally hemi-cylindrical contour, so that in combination they define an almost continuous cylindrical receiving area for engaging substantially at the entire circumference of the hydraulic line 110 (see FIG. 4); as is described in greater detail below, this configuration is made possible in part by the clamping action which is generated by the present invention, as opposed to the longer travel "pincer" action of the prior-art type of clamp described above.

As can be seen in FIG. 4, the receiving area defined by the upper and lower jaw portions is located in a middle portion of the assembly, with the co-axially aligned upper and lower bores 110, 112 for the mounting bolt on one side of the receiving area and a hinge structure which defines an upwardly-directed fulcrum 114 on the other. The hinge structure is formed by engagement of the tip 116 of an upturned flange 118 along the edge of the upper clamp member with the inside surface 120 of an inverted channel 122 which is formed along the edge of the lower clamp member. As can be seen, the inverted channel 122 is supported at the end of a web 124 that extends outwardly and upwardly from the base 126 of the lower clamp member. In some embodiments the mounting area for the bolt may be a U-shaped slot or may be formed only in the upper clamp member, or may have another suitable configuration; similarly, in some embodiments the hinge structure may have a configuration somewhat different from that which is shown, so long as it provides a suitable pivoting interconnection between the two members.

Thus, tightening of the mounting bolt (not shown) exerts a downward force against the upper surface 128 of the upper clamp member 102, in the direction indicated by arrow 130. In response to this, the upper clamp member 102 pivots on top of the hydraulic line 110, so that the upper and lower clamp members cooperate at fulcrum 114 to generate a downward clamping or pinching force against the hydraulic line, as indicated by arrow 132. Due to the mechanical advantage resulting from the location of the jaw portions between the mounting bolt and the fulcrum 114, the clamping force exerted against the hydraulic line is increased relative to that which is applied at the mounting bolt. Furthermore, because the amount of physical movement of the jaw portions is comparatively small (as compared with the pincer-like action of the prior-art type clamp described above), the jaw portions can be formed to have a contour which much more closely matches the cylindrical outer surface of the hydraulic line, so as to be able to establish a high degree of frictional engagement with the hydraulic line without creating excessively high contact pressures and the risk of damage/deformation at any given point.

As can also be seen in FIG. 4, a stop surface 134 on the bottom of the upper clamp member and a corresponding stop surface 136 on the top lower clamp member are spaced apart (when a hydraulic line of a predetermined size/diameter is initially received between the jaw portions) so as to define a narrow pinch gap 138 of a predetermined height. The height of the pinch gap is selected with regard to the diameter of the hydraulic line with which the clamp assembly is designed to be used, so as to limit the amount of clamping force/movement which can be exerted by tightening the mounting bolt to less than that which would cause the hydraulic line to be damaged. In other words, even if the mounting bolt is over-tightened, the abutment of the stop surfaces 134 and 136 will not allow compressive movement of the jaw portions beyond a predetermined limit. The clamp assembly of the present invention thus obviates any possibility of the hydraulic line being deformed or crushed between the clamp members.

Additional gaps/clearances are provided between the flange and channel portions that form fulcrum 114, and also between the downwardly projecting flange 140 that is formed along the rearward edge of the upper clamp member and an underlying recess 142 in the lower clamp member 104. These clearances/gaps permit the necessary movement to develop between the clamp members and stop surfaces 134, 136 in order to exert the clamping force against the hydraulic line.

Figure 5B:
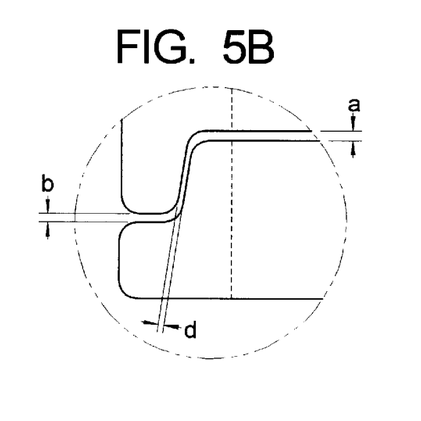
FIGS. 5B–5C are, respectively, enlarged, partial side elevational views showing the pinch gaps and engagement surfaces of the two clamp members in the areas indicated at 5B and 5C in FIG. 5A.
Figure 5C:
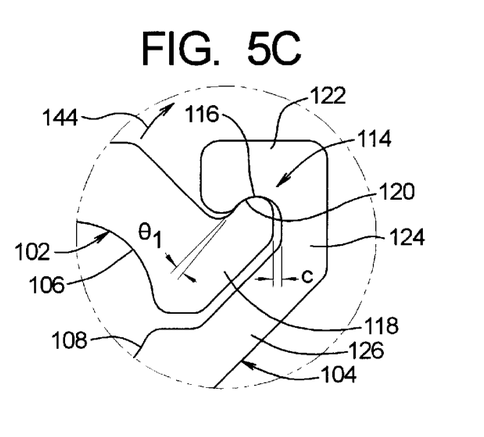
Figure 6A:
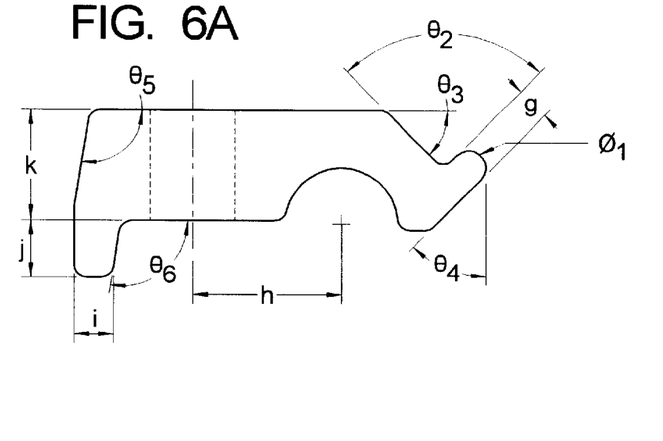
FIGS. 6A–6D are, respectively, side elevational, top plan, end elevational and perspective views of the upper clamp member of the clamp assembly of FIGS. 3–4, showing the structural details of the clamp member in greater detail.
Figure 6B:
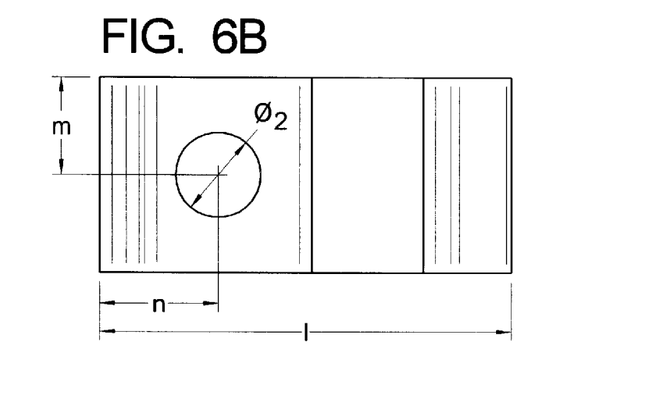
Figure 6C:
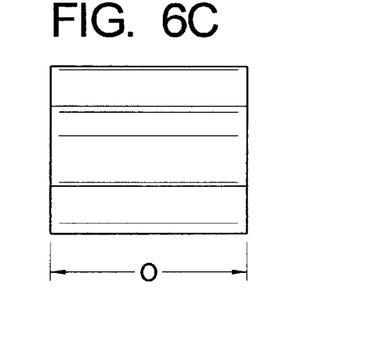
Figure 6D:
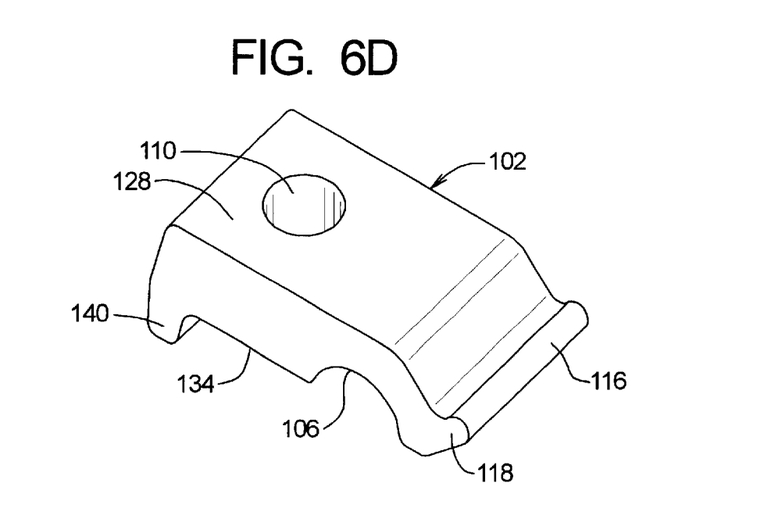
Figure 7A:
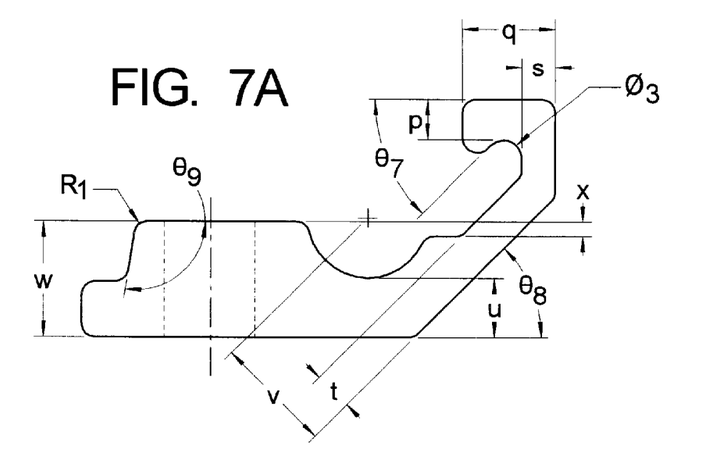
FIGS. 7A–7D are, respectively, side elevational, top plan, end elevational and perspective views of the lower clamp member of the clamp assembly of FIGS. 3–4, showing the structural details of the clamp member in greater detail.
Figure 7B:
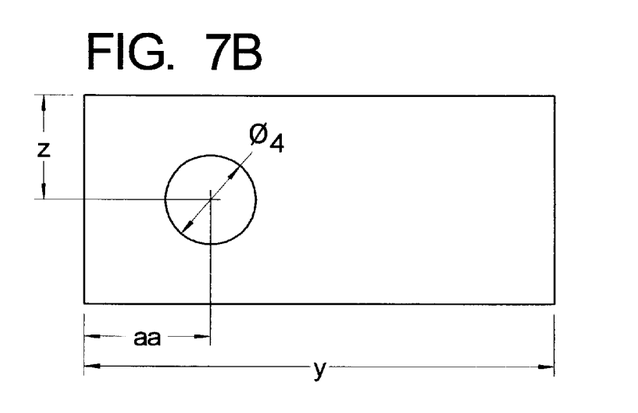
Figure 7C:
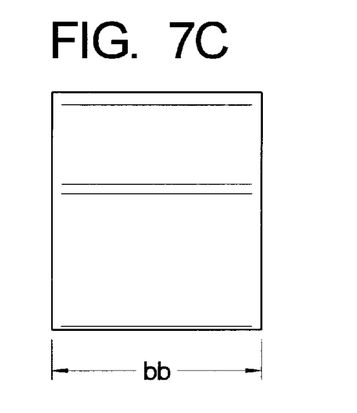
Figure 7D:
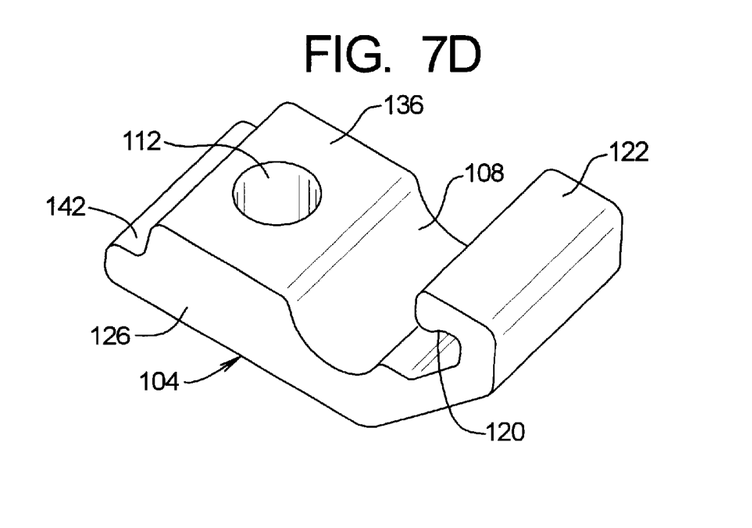

FIGS. 5A–5C show exemplary clearances/gaps for a clamp assembly 100 that is sized for use with 1.25" O.D. hydraulic line tubing. In this particular example, suitable clearances are as follows:

| | |
|---|---|
| Vertical pinch gap "a" between stop surfaces | .031 inch |
| Vertical pinch gap "b" between bottom of downwardly projecting flange and recess | .031 inch |
| Lateral gap "c" between end of rearwardly-projecting flange and surface of channel | .020 inch |
| Lateral distance "d" between downwardly-projecting flange and recess | .031 inch |
| Distance "e" from center of receiving area to axes of vertical bores | 1.25 inch |
| Diameter "f" of receiving area | 1.252 inch |

In addition, as can be seen in FIG. 5C, a slight angular gap (e.g., 5.0°) is formed between the surfaces of the flange and channel portions 118, 122 where these meet towards the inner edge of the latter. This angular gap serves to permit the opposite end of the upper clamp member to be pivoted upwardly, in the direction indicated by arrow 144 in FIG. 5C, thus permitting the upper clamp member to be placed over a hydraulic line and then slid into engagement with the lower clamp member. Furthermore, in addition to providing the fulcrum point, the hinge structure formed by the interfitting engagement of the flange and channel portions stabilizes the assembly and prevents the clamp members from twisting relative to one another or moving out of alignment, thereby providing for a much quicker and more convenient installation than the prior-art type of clamp described above; for example, the clamp members can be fitted together on the hydraulic line and then slid to the desired location with one hand, while the mounting bolt is held and inserted using the other hand.

Referring to FIGS. 6A–6D, exemplary dimensions for structural features of the upper clamp member of a clamp assembly shown in FIG. 5 are listed below:

| | |
|---|---|
| $\theta_2$ | 90.0° |
| $\theta_3$ | 45.0° |
| $\theta_4$ | 40.0° |

-continued

| | |
|---|---|
| $\theta_5$ | 100.0° |
| $\theta_6$ | 100.0° |
| $\varnothing_1$ | 0.188" |
| $\varnothing_2$ | 0.580" |
| "g" | 0.225" |
| "h" | 1.00" |
| "i" | 0.25" |
| "j" | 0.392" |
| "k" | 0.734" |
| "l" | 2.782" |
| "m" | 0.688" |
| "n" | 0.813" |
| "o" | 1.375" |

Referring to FIGS. 7A–7D, dimensions for matching lower clamp member 104 are as follows:

| | |
|---|---|
| $\theta_7$ | 40.0° |
| $\theta_8$ | 45.0° |
| $\theta_9$ | 100.0° |
| $\varnothing_3$ | 0.110" |
| $\varnothing_4$ | 0.580" |
| $R_1$ | 0.094" |
| "p" | 0.250" |
| "q" | 0.616" |
| "s" | 0.250" |
| "t" | 0.250" |
| "u" | 0.374" |
| "v" | 0.750" |
| "w" | 0.735" |
| "x" | 0.085" |
| "y" | 3.450" |
| "z" | 0.688" |
| "aa" | 0.98" |
| "bb" | 1.375" |

It should be understood that the above dimensions and angles are provided for the purpose of illustrating one preferred embodiment of the present invention, and that other embodiments may have other dimensions, depending on the size of the hydraulic tubing with which the clamp assembly is to be used, the material of which the clamp assembly is fabricated, and other design factors.

The upper and lower clamp members 102, 104 shown in FIGS. 3–7D have uniform cross-sections in the direction parallel to the axis of the receiving area. This configuration facilitates economical manufacture of the clamp members using high strength extruded aluminum alloy. Again, however, it will be understood that any suitable material or materials may be used to form the components of the clamp assembly of the present invention.

Figure 8:
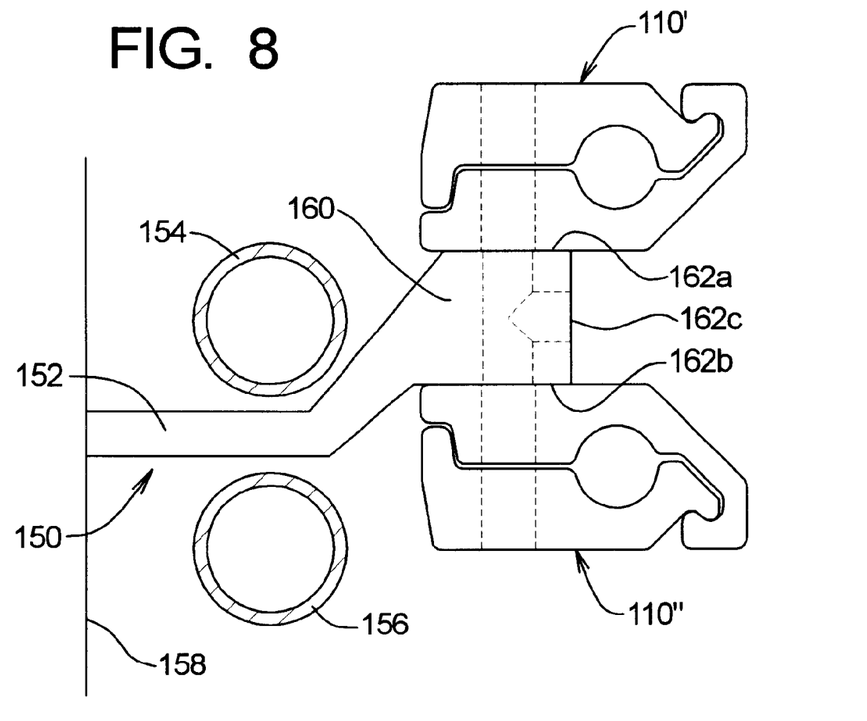
FIG. 8 is a side elevational view of first and second clamp assemblies, similar to the assembly shown in FIG. 4, showing these mounted on a bracket member in accordance with the present invention so as to retrofit first and second hydraulic lines in an area of a support member in which a plurality of hydraulic lines have previously been installed.

As was noted above, one particular advantage of bolt-on type clamp assemblies, which is shared by the clamp assembly of the present invention, is that these can be mounted to "piggy-back" on existing OEM clamps. In some installations, however, the clamp assemblies of the present invention may themselves be used as OEM hydraulic line clamps, or they may be mounted to a dedicated support member. For example, FIG. 8 shows a dedicated support bracket 150 having a base flange 152 that passes between existing hydraulic lines 154, 156 and is welded or otherwise mounted to the primary support structure 158. An attachment block 160 on the outer end of the flange portion is provided with a plurality of mounting faces 162a, 162b, 162c to which the clamp assemblies can be mounted. In the example which is shown in FIG. 8, first and second clamp assemblies 110' and 110" are mounted to opposite faces of attachment block 160, but it will be understood that clamp assemblies may be mounted to any of the attachment faces as desired.

Figure 9:
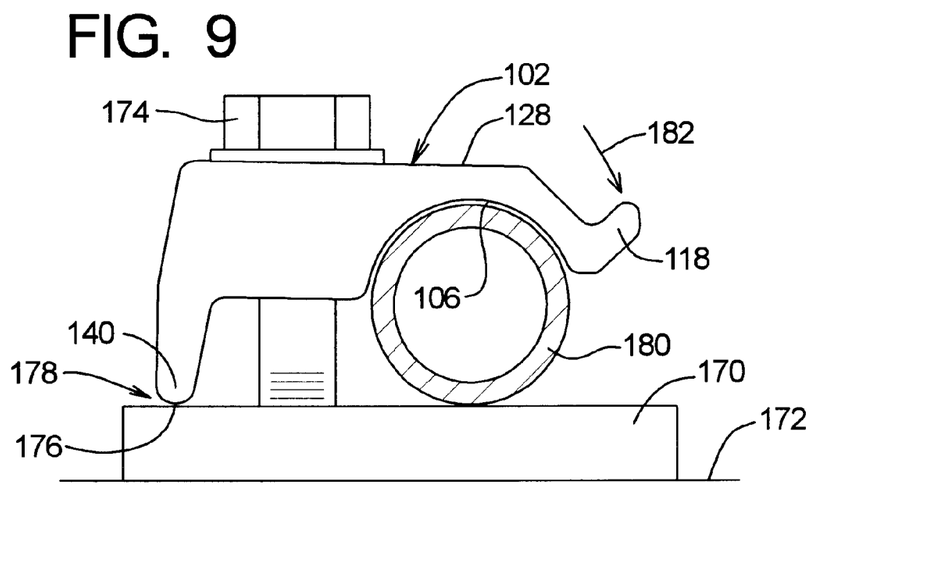
FIG. 9 is an end elevational view of the upper clamp member of a clamp assembly in accordance with the present invention, showing the manner in which this may be used separately by bolting the member directly to an underlying support structure so that the hydraulic line is clamped between the jaw portion of the upper clamp member and the surface of the support structure.

The configuration of the upper clamp member 102 in the embodiment that is illustrated in FIGS. 3–7D also enables this to be used separately, without the lower clamping member 104, if desired. In particular, as is shown in FIG. 9, the upper clamp member 102 may be mounted directly to the support structure 172, or to a threaded pad 170 that is welded to the main support structure, using a mounting bolt 174. As this is done, the bottom edge 176 of the downwardly extending flange 140 at the rear of the clamp member bears against the underlying surface so as to provide a fulcrum 178. Thus, tightening of the mounting bolt 174 causes the jaw portion of the clamp member to exert a downward clamping force against the hydraulic line 180, in the direction indicated by arrow 182. The "one-piece" installation shown in FIG. 9 does not enjoy all of the advantages provided by the full clamp assembly 110 described above, but it may be desired in some instances and this feature therefore increases the versatility of the product.

It is to be recognized that various alterations, modifications, and/or additions may be introduced into the construction and arrangement of parts described above without departing from the spirit or ambit of the present invention as defined by the appended claims.

What is claimed is:

1. A bolt-on clamp assembly for mounting a hydraulic line to a support structure, said clamp assembly comprising:
   upper and lower clamp members, said upper clamp member having a downwardly facing jaw portion and said lower clamp member having an upwardly facing jaw portion, so that said jaw portions define a receiving area for engaging said hydraulic line therein;
   a mounting portion formed on a first side of said receiving area for passage of a mounting bolt therethrough;
   and a hinge structure interconnecting said upper and lower clamp members so as to form an upwardly directed fulcrum on a second side of said receiving area opposite said mounting portion, said hinge structure comprising:
   an upwardly projecting flange portion formed along an edge of said upper clamp member; and
   an inverted channel portion formed along an edge of said lower clamp member for receiving said flange portion in pivoting engagement therewith, so as to form said upwardly directed fulcrum while preventing said upper member from twisting relative to said lower clamp member;
   so that said upper clamp member pivots downwardly about said upwardly directed fulcrum in response to tightening of said mounting bolt as said lower clamp member is held stationary by said support structure, so that said upper clamp member exerts a downwardly directed clamping force against said hydraulic line in said receiving area between said clamp members.

2. The bolt-one clamp assembly of claim 1, wherein said mounting portion comprises:
   first and second coaxially aligned bores formed in said upper and lower clamp members for passage of said mounting bolt therethrough.

3. The bolt-on clamp assembly of claim 1, further comprising:
   means for limiting downward pivoting motion of said upper clamp member so as to prevent said hydraulic line having a predetermined diameter from being crushed or deformed between said jaw portions of said upper and lower clamp members.

4. The bolt-on clamp assembly of claim 3, wherein said means for limiting downward pivoting motion of said upper clamp member comprises:
   a first stop face formed on a lower surface of said upper clamp member; and
   a second stop face formed on an upper surface of said lower clamp member in opposition to said first stop face;
   said first and second stop faces being spaced apart by a pinch gap of predetermined width when said hydraulic line having said predetermined diameter is received between said jaw portions of said upper and lower clamp members.

5. The bolt-on clamp assembly of claim 4, wherein said pinch gap is formed on said first side of said receiving area, opposite said hinge structure interconnecting said upper and lower clamp members.

6. The bolt-on clamp assembly of claim 1, further comprising:
   a downwardly projecting flange portion formed on an edge of said upper clamp member on a side of said mounting portion thereof opposite said receiving area and said upwardly projecting flange portion, for forming a fulcrum against an underlying support surface, so that said upper clamp member pivots downwardly in response to tightening of said mounting bolt so as to create a clamping force against said hydraulic line in said jaw portion thereof when said upper clamp member is used as a single piece clamp without said lower clamp member.

7. The bolt-on clamp assembly of claim 6, wherein said lower clamp member further comprises:
   a recess formed in an edge of said lower clamp member on a side of said mounting portion thereof opposite said receiving area and said channel portion for receiving said downwardly projecting flange portion of said upper clamp member therein.

8. The bolt-on clamp assembly of claim 1, wherein said jaw portions of said upper and lower clamp members each have a generally hemicylindrical contour, so that said jaw portions define a generally cylindrical receiving area engaging said hydraulic line about substantially the entire circumference thereof.

9. The bolt-on clamp assembly of claim 1, wherein said upper and lower clamp members each have a substantially uniform cross section in a direction parallel to a cylindrical axis of said receiving area, so that said clamp members are readily formed of an extruded material.

10. The bolt-on clamp assembly of claim 9, wherein said extruded material is extruded aluminum alloy.

11. A hydraulically-operated apparatus, comprising:
   a support structure;
   a hydraulic line; and
   a bolt-on clamp assembly mounting said hydraulic line to said support structure, said bolt-on clamp assembly comprising:
      upper and lower clamp members, said upper clamp member having a downwardly facing jaw portion and said lower clamp member having an upwardly facing jaw portion, so that said jaw portions define a receiving area for engaging said hydraulic line therein;
      a mounting portion formed on a first side of said receiving area and having of a mounting bolt passing downwardly therethrough into said support structure; and
      a hinge structure interconnecting said upper and lower clamp members so as to form an upwardly directed fulcrum on a second side of said receiving area opposite said mounting portion;
      so that said upper clamp member pivots downwardly about said upwardly directed fulcrum in response to tightening of said mounting bolt as said lower clamp member is held stationary by said support structure, so that said upper clamp member exerts a downwardly directed clamping force against said hydraulic line in said receiving area between said clamp members.

12. The hydraulically-operated apparatus of claim 11, wherein said support structure comprises:
   a segment of an articulated arm of said hydraulically-operated apparatus.

13. The hydraulically operated apparatus of claim 11, wherein said support structure comprises:
   an outwardly extending bracket for supporting said hydraulic line a spaced distance from a surface of said apparatus.

14. The hydraulically-operated apparatus of claim 11, wherein said hinge structure interconnecting said upper and lower clamp members of said assembly comprises:
   an upwardly projecting flange portion formed along an edge of said upper clamp member; and
   an inverted channel portion formed along an edge of said lower clamp member for receiving said flange portion in pivoting engagement therewith.

15. The hydraulically-operated apparatus of claim 14, wherein said mounting portion of said clamp assembly further comprises:
   first and second coaxially aligned bores formed in said upper and lower clamp members for passage of said mounting bolt therethrough, so as to form said upwardly directed fulcrum while preventing said upper clamp member from twisting relative to said lower clamp member.

16. A hydraulic line assembly mounted to a hydraulically operated apparatus, said hydraulic line assembly comprising:
   a hydraulic line; and
   a bolt-on clamp assembly mounting said hydraulic line to a support structure, said bolt-on clamp assembly comprising:
      upper and lower clamp members, said upper clamp member having a downwardly facing jaw portion and said lower clamp member having an upwardly facing jaw portion, so that said jaw portions define a receiving area for engaging said hydraulic line therein;
      a mounting portion formed on a first side of said receiving area and having a mounting bolt passing downwardly therethrough into said support structure;
      and a hinge structure interconnecting said upper and lower clamp members so as to form an upwardly directed fulcrum on a second side of said receiving area opposite said mounting portion, said hinge structure comprising:
         an upwardly projecting flange portion formed along an edge of said upper clamp member; and
         an inverted channel portion formed along an edge of said lower clamp member for receiving said flange portion in pivoting engagement therewith, so as to form said upwardly directed fulcrum while preventing said upper clamp member from twisting relative to said lower clamp member;

so that said upper clamp member pivots downwardly about said upwardly directed fulcrum in response to tightening of said mounting bolt as said lower clamp member is held stationary by said support structure, so that said upper clamp member exerts a downwardly directed clamping force against a hydraulic line in said receiving area between said clamp members.

17. The hydraulic line assembly of claim 16, wherein said support structure comprises:

a segment of an articulated arm of said hydraulically-operated apparatus.

18. The hydraulic line assembly of claim 16, an outwardly extending bracket for supporting said hydraulic line a spaced distance from a surface of said hydraulically-operated apparatus.

19. The hydraulic line assembly of claim 16, wherein said hinge structure interconnecting said upper and lower clamp members of said assembly comprises:

an upwardly projecting flange portion formed along an edge of said upper clamp member; and an inverted channel portion formed along an edge of said lower clamp member for receiving said flange portion in pivoting engagement therewith, so as to form said upwardly directed fulcrum while preventing said upper clamp member from twisting relative to said lower clamp member.

20. The hydraulic line assembly of claim 19, wherein said mounting portion of said clamp assembly further comprises:

first and second coaxially aligned bores formed in said upper and lower clamp members for passage of said mounting bolt therethrough.

21. A clamp assembly for mounting a hydraulic line to a support structure, said clamp assembly comprising:

an upper clamp member for exerting downward clamping force against said hydraulic line, said upper clamp member comprising:

a downwardly facing, generally hemicylindrical jaw portion;

an upwardly projecting flange portion along an edge of said upper clamp member on a first side of said jaw portion, said flange portion extending generally parallel to a cylindrical axis of said jaw portion;

a mounting portion on a second side of said jaw portion, said mounting portion having a generally vertical bore for passage of a mounting bolt therethrough; and a generally horizontal stop face formed in a lower surface of said mounting portion; and a lower clamp member for resting against said support structure, said lower clamp member comprising:

an upwardly facing, generally hemicylindrical jaw portion that cooperates with said jaw portion of said upper clamp member to define a generally cylindrical receiving area for receiving and engaging said hydraulic line therein;

an inverted channel portion along an edge of said lower clamp member on a first side of said jaw portion for receiving said flange portion of said upper clamp member in pivoting engagement therewith, so as to form a fulcrum for downward pivoting movement of said upper clamp member on response to tightening of said mounting bolt while preventing said upper clamp member from twisting relative to said lower clamp member;

a mounting portion on second side of said jaw portion, said mounting portion having a generally vertical bore that aligns coaxially with said bore in said mounting portion of said upper clamp member for passage of said mounting bolt therethrough; and a generally horizontal stop face formed on an upper surface of said mounting portion, said stop face on said lower clamp member being spaced apart from said stop face on said upper clamp member by a pinch gap of predetermined height when said hydraulic line having a predetermined diameter is received between said jaw portions of said upper and lower clamp members, so that said stop faces limit downward pivoting motion of said upper clamp member so as to prevent said hydraulic line from being crushed or deformed between said jaw portions of said members.

22. The bolt-on clamp assembly of claim 21, wherein said upper and lower clamp members each have a substantially uniform cross-section in a direction parallel to a cylindrical axis of said jaw portion, so that said clamp members are readily formed of extruded material.

23. The bolt-on clamp assembly of claim 22, wherein said upper clamp member further comprises:

a downwardly projecting flange portion formed on an edge of said upper clamp member on a side of said mounting portion opposite said receiving area and said upwardly projecting flange portion, for forming a fulcrum against an underlying support surface so that said upper clamp member pivots downwardly in response to tightening said mounting bolt so as to create a clamping force against said hydraulic line in said jaw portion thereof when said upper clamp member is used as a single piece clamp without said lower clamp member.

24. The bolt-on clamp assembly of claim 23, wherein said lower clamp member further comprises:

a recess formed in an edge of said lower clamp member on a side of said mounting portion opposite said receiving area and said channel portion for receiving said downwardly projecting flange portion of said upper clamp member therein.

25. A bolt-on clamp assembly for mounting a hydraulic line to a support structure, said clamp assembly comprising:

(a) a lower clamp member, comprising:

a generally rectangular body having first and second ends;

a generally flat base on a lower side of said body for resting on a surface of said support structure in load-bearing engagement therewith;

a concave, generally hemicylindrical lower jaw portion on an upper side of said body for receiving a hydraulic line therein, said jaw portion being formed proximate said first end of said body;

an unthreaded bore for passage of a mounting bolt therethrough, said bore being formed proximate said second end of said body;

a web portion extending outwardly and upwardly at said first end of said body;

an inverted channel portion extending inwardly from an upper end of said flange portion and facing downwardly therefrom, said channel portion extending generally parallel to an axis of said jaw portion; and (b) an upper clamp member, comprising:

a generally rectangular body having first and second ends;

a concave, generally hemicylindrical upper jaw portion on a lower side of said body for receiving a hydraulic line therein, said jaw portion being formed proximate said first end of said body;

an unthreaded bore for passage of a mounting bolt therethrough, said bore being formed proximate said second end of said body;

a flange portion extending outwardly and upwardly from said first end of said body;

a rounded tip formed on an upper edge of said flange portion and facing upwardly therefrom for being received in said downwardly facing inverted channel on said lower clamp member in pivoting engagement so as to form an upwardly directed fulcrum therewith, said rounded tip extending generally parallel to an axis of said concave jaw portion;

a flange portion projecting downwardly from said second end of said body; and a rounded tip formed on a lower edge of said flange portion and facing downwardly therefrom for bearing against said surface of said support structure in pivoting engagement so as to form a downwardly directed fulcrum therewith, when said upper clamp member is installed without said lower clamp member, said rounded tip extending generally parallel to an axis of said concave jaw portion.

26. The clamp assembly of claim 25, wherein said lower clamp member further comprises:

a downwardly extending recess formed in said second end of said body for receiving said downwardly projecting flange portion of said upper clamp member, said recess having a bottom surface that faces upwardly towards said lower edge of said flange portion so as to form a stop that prevents overtightening of said clamp assembly against said hydraulic line.

27. The clamp assembly of claim 25, wherein said tip of said flange portion of said upper clamp member comprises:

an upwardly extending outer surface that is spaced from an adjoining surface of said inverted channel by a predetermined clearance gap; and an upwardly and outwardly extending inner surface that is spaced from an adjoining surface of said inverted channel by a predetermined angular gap;

so that said upper clamp member can be placed over said hydraulic line and then pivoted and slid into engagement with said lower clamp member.

28. The clamp assembly of claim 27 wherein said predetermined angular gap is an angular gap of about 5°.

* * * * *